US008538995B2

(12) United States Patent
Shimada et al.

(10) Patent No.: US 8,538,995 B2
(45) Date of Patent: Sep. 17, 2013

(54) DEVICE AND METHOD FOR AUTOMATICALLY DETECTING AN UNCLEAR DESCRIPTION

(75) Inventors: Kuniaki Shimada, Kawasaki (JP); Yukihiro Watanabe, Kawasaki (JP); Shinji Kikuchi, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 13/354,650

(22) Filed: Jan. 20, 2012

(65) Prior Publication Data

US 2012/0233156 A1 Sep. 13, 2012

(30) Foreign Application Priority Data

Mar. 10, 2011 (JP) ................................. 2011-053565

(51) Int. Cl.
*G06F 17/30* (2006.01)
(52) U.S. Cl.
USPC ............ 707/791; 707/802; 707/822; 707/828
(58) Field of Classification Search
USPC ................................................ 707/600–899
See application file for complete search history.

(56) References Cited

U.S. PATENT DOCUMENTS

| 7,890,653 | B2 | 2/2011 | Kutsumi et al. |
| 2003/0093312 | A1 | 5/2003 | Ukita et al. |
| 2004/0138932 | A1* | 7/2004 | Johnson et al. .................. 705/7 |

FOREIGN PATENT DOCUMENTS

| JP | 2003-150772 A | 5/2003 |
| JP | 2004-326537 A | 11/2004 |
| JP | 2007-328526 A | 12/2007 |
| WO | WO-2004/104881 | 12/2004 |

* cited by examiner

*Primary Examiner* — Isaac M Woo
(74) *Attorney, Agent, or Firm* — Fujitsu Patent Center

(57) ABSTRACT

According to an instruction manual generated by an instruction manual generator, a process log of a practical process performed by a plurality of instruction executers is acquired. A command described in the instruction manual is extracted, and extracted commands are extracted from each process log. The sections of the process logs sectioned by the extracted commands are numbered, and the number of executions of the commands different from the extracted command is counted. When the variance of the number of the executions of a command in a section common in the plurality of process logs is larger than a specified value, the possibility of an unclear description in the corresponding section in the instruction manual is displayed for notification of a different process performed for each instruction executer.

7 Claims, 13 Drawing Sheets

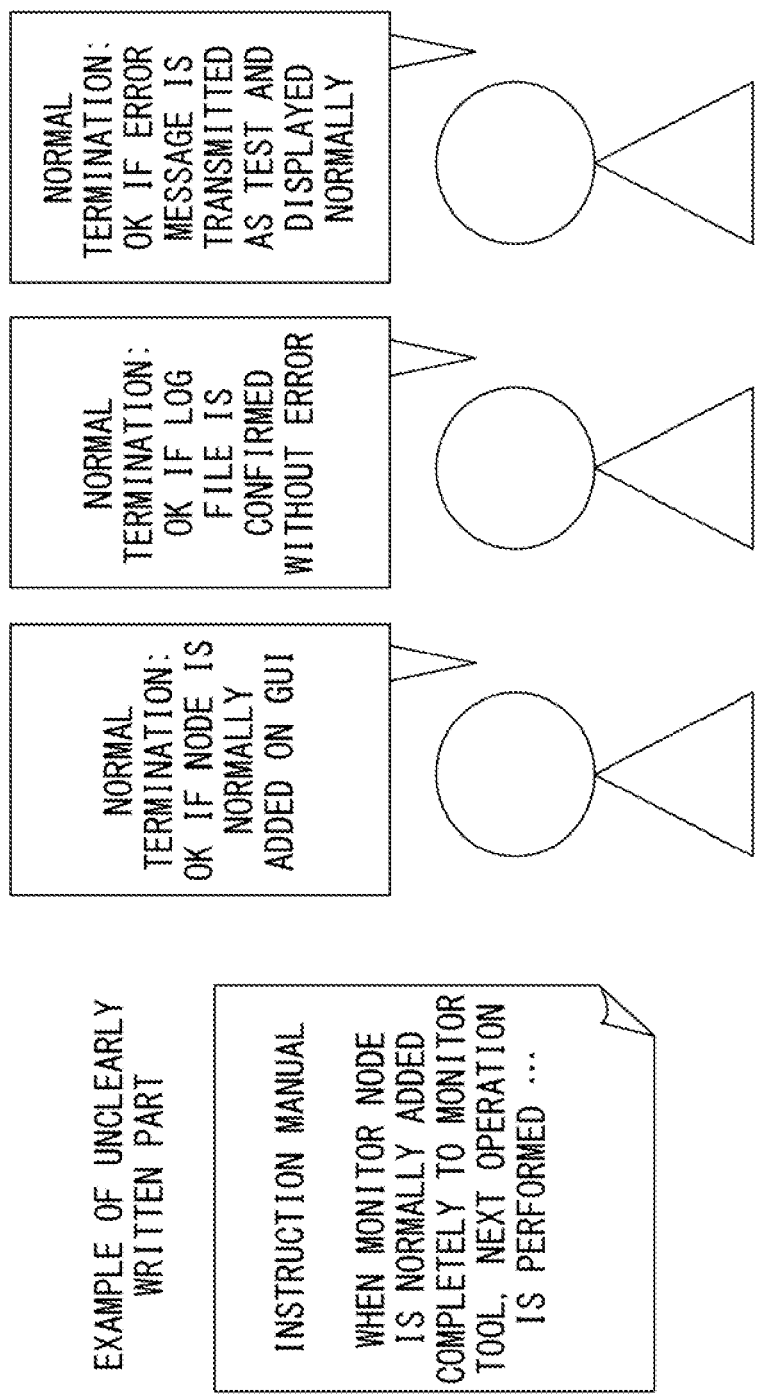
F I G. 2

INSTRUCTION MANUAL

```
DOWNLOADING PATCH.RPM
DOWNLOADING PATCH2.RPM

APPLYING PATCH
# rpm -Uvh /tmp/patch.rpm

REBOOTING PROCESS PROGRAM1, AND
CONFIRMING ACTIVATION OF PROGRAM1

APPLYING PATCH
# rpm -Uvh /tmp/patch2.rpm

REBOOTING PROCESS PROGRAM2

BACK OUT OF SETTING FILE (A.CONF)
# cp /apl/conf/a.conf /root/201007

CHANGING TIMEOUT VALUE OF A.CONF INTO
500
```

(a)

 EXTRACTING INTRA-INSTRUCTION MANUAL COMMAND

| # rpm -Uvh /tmp/patch.rpm |
| # rpm -Uvh /tmp/patch2.rpm |
| # cp /apl/conf/a.conf /root/201007 |

(b)

F I G. 7 A

PROCESS LOG 1

```
# scp user@server:/tmp/
patch.rpm .
# scp user@server:/tmp/
patch2.rpm .
# rpm -Uvh /tmp/patch.rpm
# service program1 restart
ps -ef | grep program1
rpm -Uvh /tmp/patch2.rpm
service program2 restart
# cp /apl/conf/a.conf /
root/201007
#vi /apl/conf/a.conf
```

PROCESS LOG 2

```
# scp user@server:/tmp/
patch.rpm .
# scp user@server:/tmp/
patch2.rpm .
# rpm -Uvh /tmp/patch.rpm
# service program1 restart
ps -ef | grep program1
rpm -Uvh /tmp/patch2.rpm
service program2 restart
# cp /apl/conf/a.conf /
root/201007
#vi /apl/conf/a.conf
```

PROCESS LOG 3

```
# scp user@server:/tmp/
patch.rpm .
# scp user@server:/tmp/
patch2.rpm .
# rpm -Uvh /tmp/patch.rpm
# service program1 restart
telnet 8080 server.jp
rpm -Uvh /tmp/patch2.rpm
service program2 restart
# cp /apl/conf/a.conf /
root/201007
#vi /apl/conf/a.conf
```

⇩ EXTRACTING INTRA-PROCESS LOG COMMAND

FIG. 7B

```
(1) # scp user@server:/tmp/patch.rpm .
    # scp user@server:/tmp/patch2.rpm .

(2) # rpm ?Uvh /tmp/patch.rpm
    # service program1 restart
    # ps -ef | grep program1

(3) # rpm -Uvh /tmp/patch2.rpm
    # service program2 restart (4) # cp /apl/conf/a.conf /root/201007
    # vi /apl/conf/a.conf
```

```
# scp user@server:/tmp/patch.rpm .
# scp user@server:/tmp/patch2.rpm .

# rpm -Uvh /tmp/patch.rpm
# service program1 restart
ps -ef | grep program1 rpm -Uvh /tmp/patch2.rpm
service program2 restart cp /apl/conf/a.conf /root/201007
vi /apl/conf/a.conf
```

```
# scp user@server:/tmp/patch.rpm .
# scp user@server:/tmp/patch2.rpm .

# rpm -Uvh /tmp/patch.rpm
# service program1 restart
telnet 8080 server.jp rpm -Uvh /tmp/patch2.rpm
service program2 restart cp /apl/conf/a.conf /root/201007
vi /apl/conf/a.conf
```

FIG. 7C

EVALUATING COMMAND BETWEEN (START) AND RPM

| | COMMAND | PROCESS LOG1 | PROCESS LOG2 | PROCESS LOG3 | AVERAGE | VARIANCE |
|---|---|---|---|---|---|---|
| (1) | # scp user@server:/tmp/patch.rpm . | 1 | 1 | 1 | 1 | 0 |
| (1) | # scp user@server:/tmp/patch2.rpm . | 1 | 1 | 1 | 1 | 0 |
| (2) | # service program1 restart | 1 | 1 | 1 | 1 | 0 |
| (2) | # ps -ef | grep program1 | 1 | 1 | 0 | 0.667 | 0.333 |
| (2) | # telnet 8080 server.jp | 0 | 0 | 1 | 0.333 | 0.333 |
| (3) | # service program2 restart | 1 | 1 | 1 | 1 | 0 |
| (4) | # vi /apl/conf/a.conf | 1 | 1 | 1 | 1 | 0 |

| UNCLEAR PART IN INSTRUCTION MANUAL |
|---|
| — ANALYSIS RESULT — UNCLEAR IN (2) |

| | |
|---|---|
| (1) | DOWNLOADING PATCH.RPM APPLYING PATCH |
| | # rpm -Uvh /tmp/patch.rpm |
| (2) | REBOOTING PROCESS PROGRAM, AND CONFIRMING ACTIVATION OF PROGRAM1 |
| | # rpm -Uvh /tmp/patch2.rpm |
| (3) | REBOOTING PROCESS PROGRAM2 |
| | # cp /apl/conf/a.conf /root/201007 |
| (4) | CHANGING TIMEOUT VALUE OF A.CONF INTO 500 |

| DETAILED COMMAND |
|---|
| LIST OF COMMANDS WHOSE VARIANCE IS EQUAL TO OR OVER 0.3 IN (2) |

| COMMAND AT HIGH UNCLEAR LEVEL | VARIANCE |
|---|---|
| # ps -ef \| grep program1 | 0.33 |
| # telnet 8080 server.jp | 0.33 |

DEVICE AND METHOD FOR AUTOMATICALLY DETECTING AN UNCLEAR DESCRIPTION

CROSS-REFERENCE TO RELATED APPLICATIONS

This application is based upon and claims the benefit of priority of the prior Japanese Patent Application No. 2011-053565, filed on Mar. 10, 2011, the entire contents of which are incorporated herein by reference.

FIELD

The following embodiment relates to a device and a method for automatically detecting an unclear description in an instruction manual in managing an information processing system.

BACKGROUND

Recently, a system of an organization having an information processing system and presenting various services to an end user has been introduced. In a computer system of the organization, a manager sequentially performs managing operations according to an instruction manual. The instruction manual is a detailed operation manual (document) generated in individual operation work item units, and includes a patch application instruction manual, a backup instruction manual, a monitor instruction manual, etc.

However, if the description of an instruction manual is unclear, the contents of the processes performed in a managing operation may depend on the operation manager, thereby causing unstable quality reference of an operation, or causing variance of operation contents and quality depending on the operator. However, it is hard to detect an unclearly written part. Although an unclearly written part is to be detected in an instruction manual by a user reviewing the descriptions of the instruction manual, the user often overlooks the part.

In the operation management of an IT (information technology) architect, there is a regulation that an instruction manual without operation rules is not to be used.

FIGS. 1 and 2 are explanatory views of an example of the operation managing method of a system using an instruction manual.

In this example, the instruction manual is, for example, a detailed operation manual (operation instruction manual) generated in individual operation work item units such as a monitor instruction manual, an online operation instruction manual, a backup instruction manual, etc. Generally, in a development phase, an infrastructural team (basic operation team) works as a leader in generating the documents, and in a preparation stage of an operation maintenance phase, a leader group for the maintenance operation inherits the documents.

Before inheriting the instruction manual, documents are described mainly for each individual operation. Practically, a managing operation group adds and checks the operation flow based on the operation rule for an operation system when an operation is performed, an operation approver, an operation schedule, a report format, a contingency method, a relation to other operation work, an operation quality index, etc. These items are described as upper documents of an operation instruction manual, a link is prepared for each instruction manual from the operation flow, or an operation flow etc. to be added to the instruction manual is described.

When a managing operation is performed using an instruction manual in which an operation rule is not described, a receiving method of an operation and a quality standard is shifted, and an information and notification rule applied when an operation is terminated is unclear, thereby varying the contents and quality of the operation depending on an operator.

For example, as illustrated in FIG. 2, in a monitoring operation, assume that there is an instruction manual describing "when a monitor node is normally added to a monitor tool, the next operation is performed . . . ". In this case, since the confirmation reference of the normal termination of a node adding operation is unclear, there arises the variance in the determination of a person in charge whether it is accepted if a node is added on a GUI (graphic user interface), whether it is accepted if there is no error occurring after the confirmation of a log file, or whether it is accepted if an error message is normally transmitted and displayed.

In addition, there may not be the descriptions in the instruction manual about the contents as to who determines (or approves) the normal termination and passes control to the next operation, where the trail is described, to whom an abnormal state is to be escalated, etc. Depending on the operation fields, the operation rule may be stored in the memory of a specific operation manager, and the manager may answer any question. A person having a long field experience may store the rule as an implicit rule. However, the situation above promotes the personal dependency and may cause the interference with the transparency of the operation. Therefore, it is preferable that the operation rule is stipulated.

In the example above, if the operation rule regulates the checking reference for normality confirmation of an operation (by confirmation with two patterns for log confirmation, input of a status command, etc.), the execution system of the operation (the operation to be performed necessarily by two persons, etc.), the destination of a report of the completion of an operation and a termination reference, the format and the storage of the operation trail, etc., a "managing operation instruction manual" whose operation flow includes the contents above can be completed. In addition, stipulating the operation flow based on the common rules not only enables the operation quality to be guaranteed, but also allows the transparency of the operations to be guaranteed and the information to be shared among the operations.

The basic structure for generating the operation rules described above is an operation management policy determined by a related organization. As a corporation rule, a common rule in an operation maintenance phase (a person capable of changing a system and approving a release is limited to a person having the right of a field manager or a person in a higher position), a process to be necessarily performed, etc. are regulated.

Then, operation instructions are generated based on the operation rules. Thus, the individual managing operation flow can be clearly regulated. If the operation management instructions are checked in the operation field based on the operation policy, the entire operation can be standardized.

Assume that a Web 3 hierarchical system (Web server+application server+DB server) provides a Web mail service. In this case, it is assumed that the system is operation-managed. In the operation management, when a fault occurs, a service stops and the performance is degraded (low response), thereby inflicting a loss upon a client. Therefore, it is requested to suppress a fault or a prompt recovery from a fault if it occurs.

A fault often occurs by a mistake of an operation manager. For example, it occurs by performing an erroneous operation by applying a patch to a Web server etc. Practically, a patch application instruction is often prepared as an instruction manual, and an operator performs an operation while referring to the instruction manual. Although the instructions are entirely described by a script and automated, complete automation cannot be practically realized. However, when there are errors in the instructions or the instruction manual, or they are unclearly written, the operation manager can perform an erroneous operation by misunderstanding the use.

Assume that the instruction manual includes the instruction to temporarily stop the Web server, performs maintenance and inspection, and then restarts the server. Also assume that an operation manager A shuts down the Web server, inspects it, and activates it. An operation manager B changes the settings (temporarily deletes the current settings from the allocation list) of a load balancer, shuts down the Web server, inspects it, activates it, and changes the settings (adds new settings to the allocation list) of the load balancer.

In this case, the operation manager A forgets the setting change of the load balancer, and therefore a request is allocated to the Web server. As a result, a fault for which the request cannot be processed occurs. Since it is clear that the setting change is made to the load balancer when the Web server is stopped, it is not described. However, when a person not familiar with the system configuration performs the instruction, a fault occurs awkwardly.

NON-PATENT DOCUMENT 1 http://itpro.nikkeibp.co.jp/article/COLUMN/209 0902/ 336388

SUMMARY

In an aspect of the embodiment, a device for automatically detecting a description extracts an unclear part in an instruction manual describing a processing instruction when managing and operating an information processing system, and includes: a log acquisition unit to acquire a log of processes performed by a plurality of instruction executers according to the instruction manual; an intra-instruction-manual command extraction unit to extract a command and its line position in the instruction manual; an intra-log command extraction unit to extract the command extracted by the intra-instruction-manual command extraction unit from each of the plurality of logs, and divide the command into inter-command sections; an unclear level evaluation unit used in the inter-command sections in the log to count a number of executions of a command different from the extracted command with respect to the plurality of logs, and calculate a variance of the number of executions for each command among the plurality of logs; and an unclear part presentation unit to display a section of an instruction manual including a command whose variance is larger than a specified value according to a calculation result of the unclear level evaluation unit as a part which is possibly an unclear description.

In the aspect above, the device for automatically detecting and correcting an unclear description in an instruction manual can be provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory view (2) of the prior art and its problems;

FIGS. 7A through 7C are an explanatory view (1) of an example of the operation of an embodiment of the present invention;

FIG. 8 is an explanatory view (2) of an example of the operation of an embodiment of the present invention;

FIG. 9 is an explanatory view (3) of an example of the operation of an embodiment of the present invention.

DESCRIPTION OF EMBODIMENTS

In an embodiment of the present invention, when there are a plurality of process logs, one or more commands (reference commands) commonly detected in each process log are used. The plurality of process logs uses the log(information) about the process by a plurality of persons who perform the processes with reference to one shared instruction manual. The computer calculates and outputs the matching level of the commands stored in the process log prior to (or subsequent to) the reference command in each process log. Thus, the degree of the variance of the contents among the logs of the process before or after the reference command can be recognized.

Furthermore, the computer can determine that the description before (or after) the description of the reference command included in the instruction manual is an unclear part by retrieving the part including the reference command in the description of the instruction manual. Then, the computer can present a user of the computer etc. with the part of the unclear description in the instruction manual by displaying the information about the part of the description determined as an unclear part.

Figure 1:
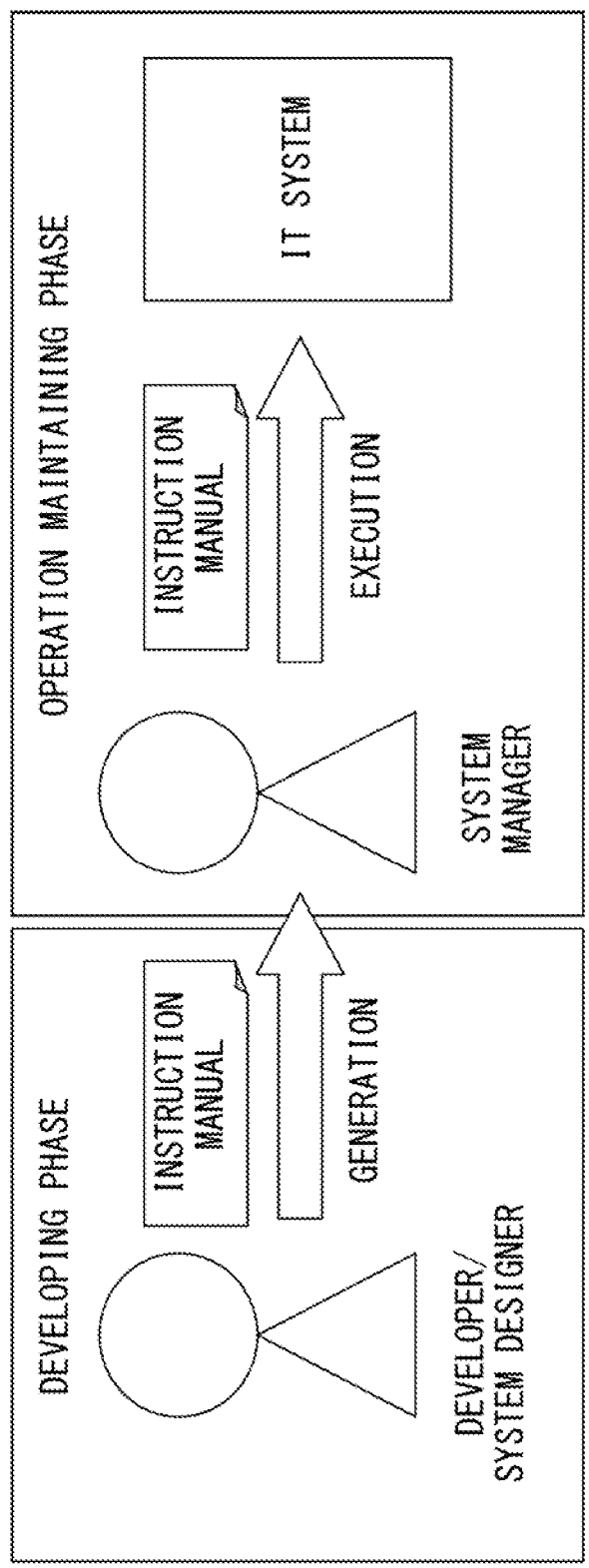
FIG. 1 is an explanatory view (1) of the prior art and its problems.
Figure 3:
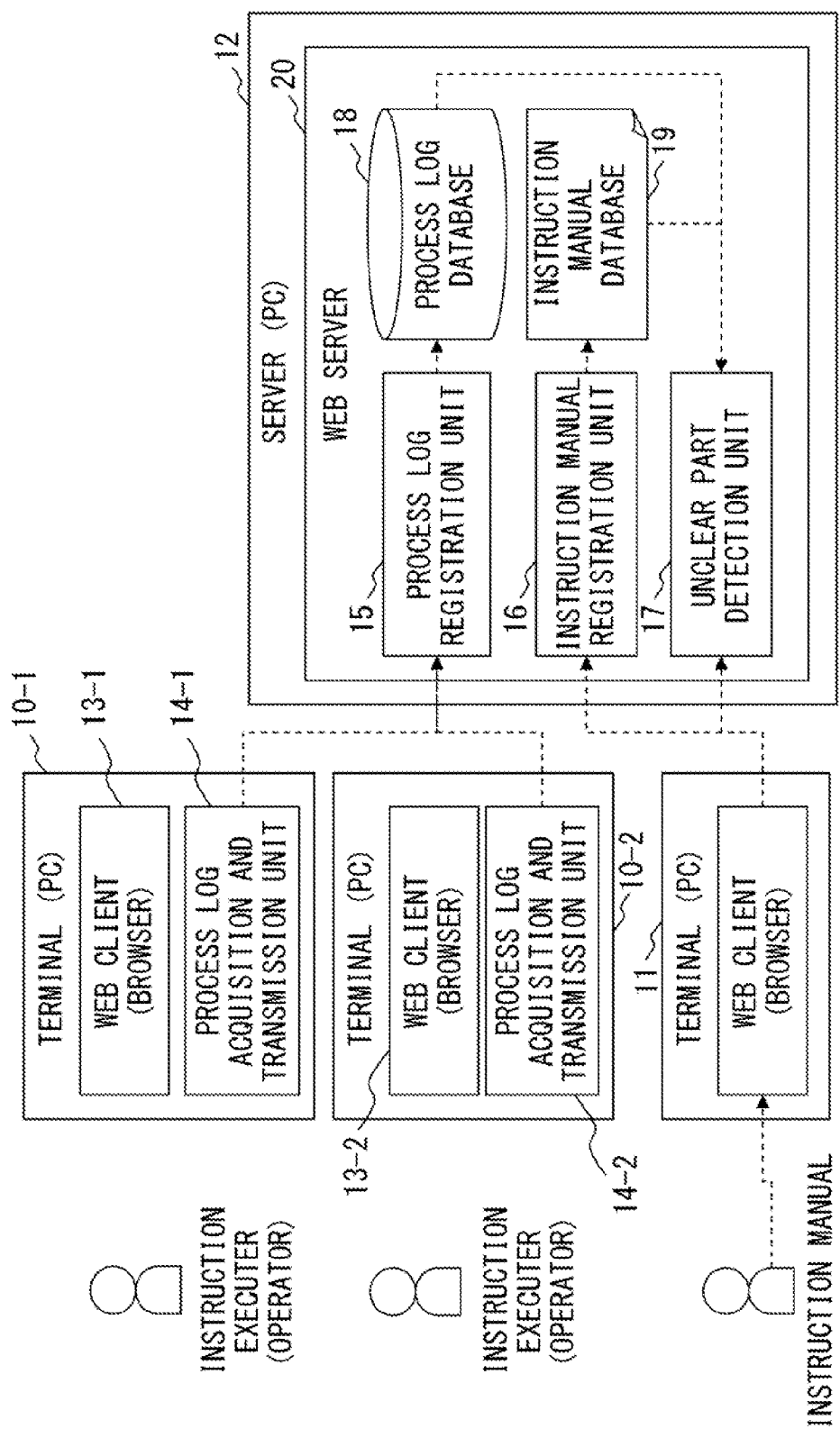
FIG. 3 is a configuration of the system according to an embodiment of the present invention.

FIG. 3 is a configuration of the system according to the present invention.

The process according to the present embodiment is performed by a server 12 (PC in this example) as a computer. To the server 12, terminals (for example, a computer such as a PC) 10-1 and 10-2 operated by an instruction executer (operator), and a terminal (for example, a computer such as a PC) 11 operated by an instruction manual generator (knowledge maintainer are connected. The terminals 10-1 and 10-2 operated by the operator are provided with Web clients 13-1 and 13-2 as browsers for access to the server 12. In addition, to acquire the logs of the process performed by the operator, process log acquisition and transmission units 14-1 and 14-2 are provided.

The server 12 is provided with a Web server 20. The Web server 20 is provided with a process log registration unit 15 for registering a process log transmitted from the terminals 10-1 and 10-2, an instruction manual registration unit 16 for access by the terminal 11 and for registering an instruction manual, and an unclear part detection unit 17 for detecting an unclear part in the instruction manual. The Web server 20 is further provided with a process log database 18 for storing a process log and an instruction manual database 19 for registering an instruction manual. The unclear part detection unit 17 acquires a process log from the process log database 18 at a request to detect an unclear part from the terminal 11 side, acquires an instruction manual from the instruction manual database 19, extracts the unclear part of the instruction manual, and holds a result, thereby outputting data (display, printout, etc.) on, for example, the terminal 11.

Figure 4:
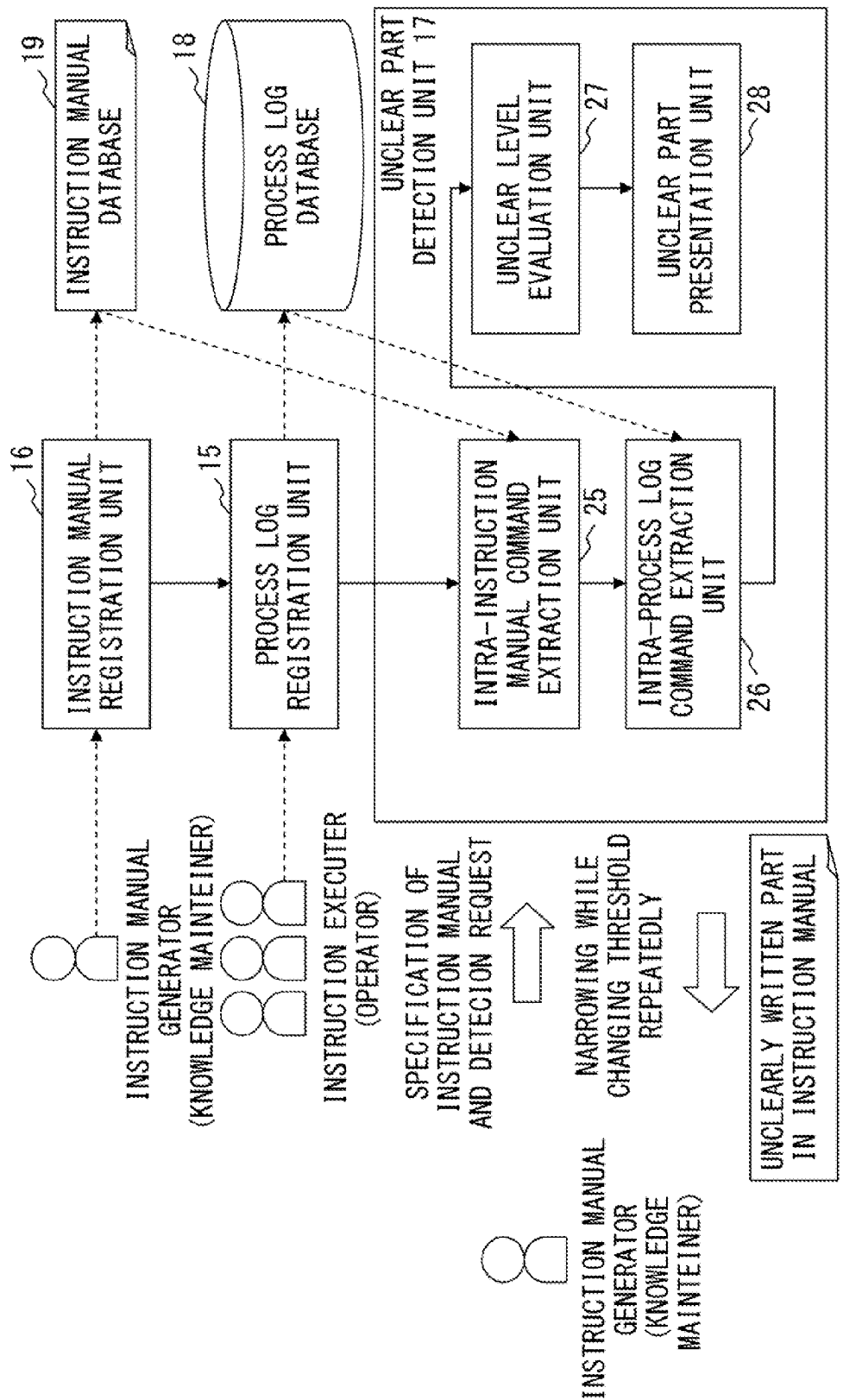
FIG. 4 is a flow of the entire process according to an embodiment of the present invention.

FIG. 4 is a flow of the entire process according to the present embodiment.

The instruction manual generated by an instruction manual generator (knowledge maintainer) is stored in the instruction manual database 19 through the instruction manual registration unit 16. The process log registration unit 15 acquires a process log about the process performed by a plurality of instruction executers (operators), and stores the log in the process log database 18. Upon receipt of a specification of the instruction manual from the instruction manual generator and a request to detect an unclear part, an intra-instruction manual command extraction unit 25 in the unclear part detection unit 17 reads the instruction manual from the instruction manual database 19, and extracts a command in the instruction manual. That is, for example, a description corresponding to the command is extracted by searching the text in the descriptions in the text of the instruction manual. One or more commands to be retrieved can be stored in advance, and the described portion matching the stored one or more commands the one or more stored command can be extracted from the instruction manual data. Next, an intra-process log command extraction unit 26 reads the process log from the process log database 18, and extracts a command in the process log. A command in the process log is extracted from each of the plurality of process logs corresponding to the same instruction manual. Also in this process, the data portion matching the command in the one or more stored commands in the log data of the process can be extracted.

An unclear level evaluation unit 27 evaluates the unclear level of an instruction manual using an extracted command in the instruction manual and a command in the process log. The unclear part extracted in the unclear level evaluation unit 27 is presented (output) by an unclear part presentation unit 28 to the instruction manual generator. For example, if the matching level of the process is evaluated by a plurality of process logs about the contents of the process log before (or after) the command X included in the process log and the matching level is low (the process contents do not match and the variance is high) when a command X is extracted from the instruction manual and the command X is also extracted from the process log, then it is determined that there is an unclear part in the description before (or after) the part described about the command X in the instruction manual.

As the output method of a determination result, for example, the contents of the description of the instruction manual are displayed on the screen, and the command X is highlighted (for example, displayed in red) with the contents of the description of the instruction manual displayed on the screen, and a message that there is a preceding unclear description so that an unclear part can be apparently indicated.

The instruction manual generator can perform the process of repeating extracting an unclear part while changing the threshold (described later) for detection of an unclear part, and narrowing the part unclearly written in the instruction manual. If the unclearly written part in the instruction manual is designated, the instruction manual generator can correct the unclear description in the instruction manual.

Figure 5A:
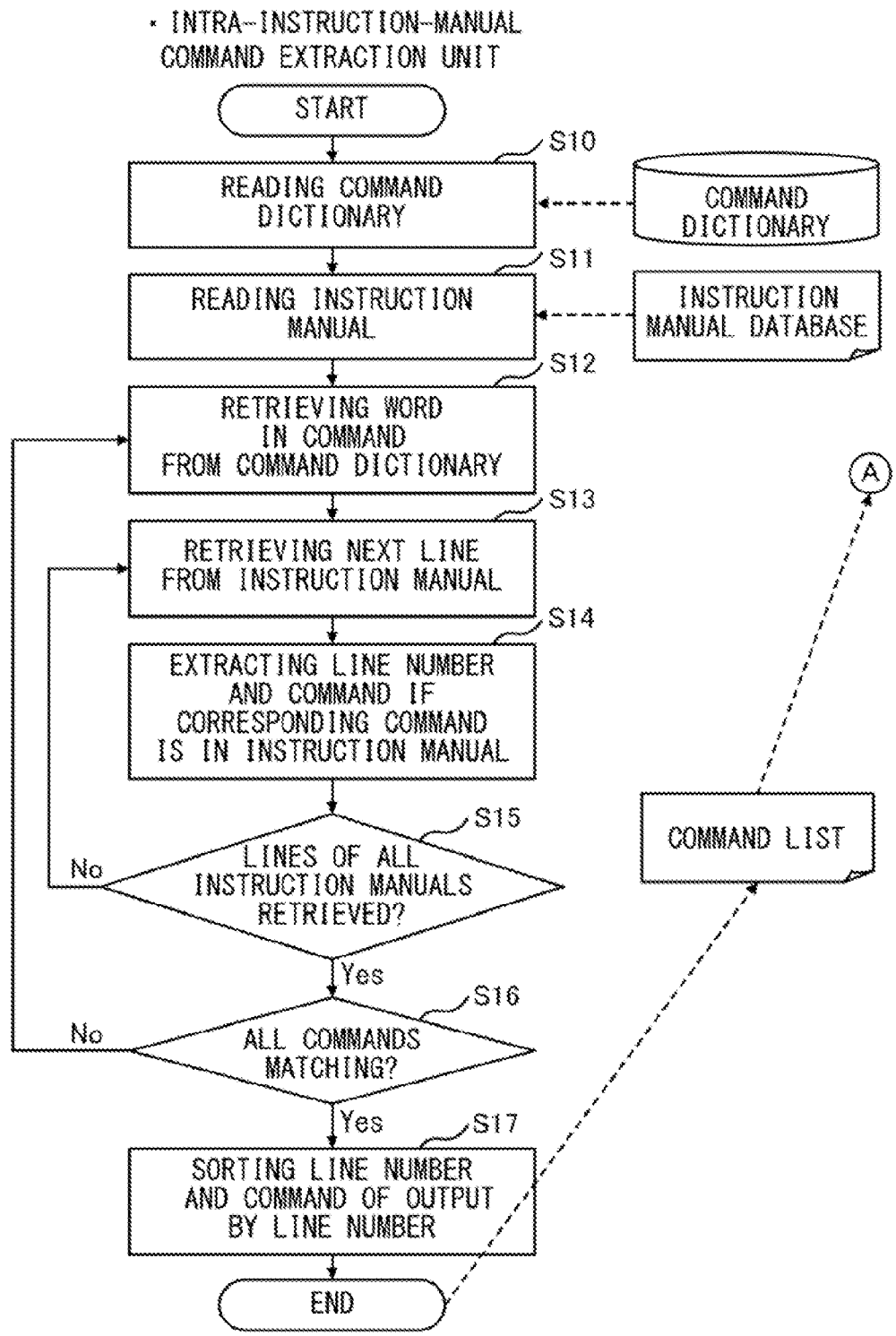
FIGS. 5A and 5B are a detailed flow (1) of an embodiment of the present invention.
Figure 6:
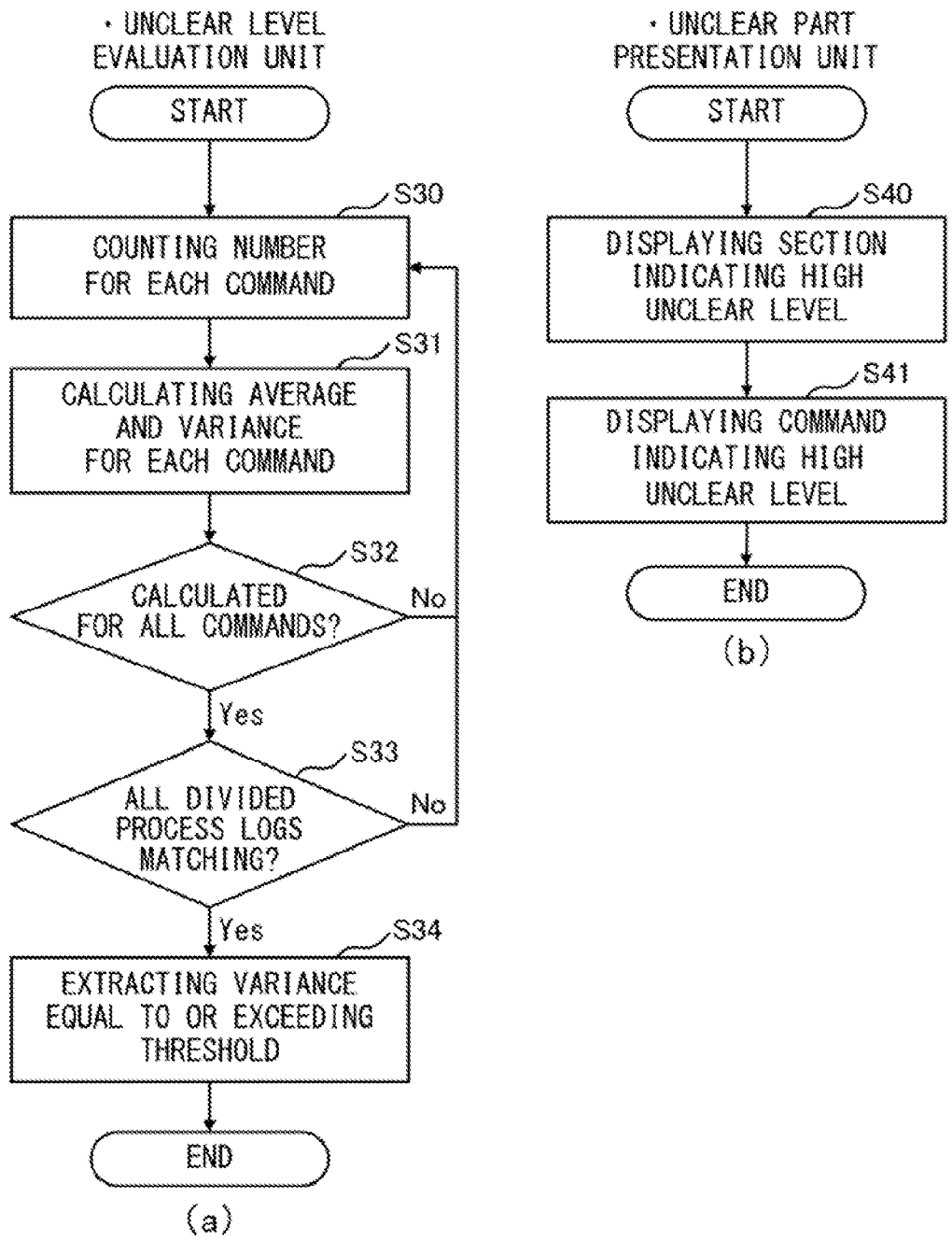
FIG. 6 is a detailed flow (2) of an embodiment of the present invention.

FIGS. 5A and 6 are examples of the process according to the present embodiment.

In FIG. 5A is an example of the flow of the process of the intra-instruction-manual command extraction unit. In the intra-instruction-manual command extraction unit, a command such as telnet etc. is extracted from the instruction manual. In step S10, a command dictionary is read. In the command dictionary, a command such as telnet etc. used by the OS (operating system), for example, Linux (registered trademark), Windows (registered trademark), etc. is registered. The command used by each OS is stored as a dictionary, and read when the process of the intra-instruction-manual command extraction unit is performed. Next, in step S11, the text of the instruction manual is read from the instruction manual database. In step S12, a word of the command is retrieved from the read command dictionary. In step S13, one line is retrieved from the instruction manual. In step S14, it is determined whether or not the command retrieved from the command dictionary is located in the line read from the instruction manual. If it is located there, the line number and the command are extracted. The number of the line in which the command is located refers to the line position where the command is located. In step S15, it is determined whether or not the processes have been performed on all lines in the instruction manual. If the processes have not been completed, control is returned to step S13, and the next line in the instruction manual is processed. If the processes have been completed on all lines (the specification of limiting the lines to be processed to only a part of the lines can be performed using the input device of the terminal 11 depending on the input) of the instruction manual, then control is passed to step S16. In step S16, it is determined whether or not the process has been performed on all commands (commands can be limited to not all commands, but one specific command, or one or more specific commands specified depending on the input using the input device in the terminal 11) in the command dictionary. In step S16, if the process has not been completed on all commands, then control is returned to step S12, and the process is performed on the next command. In step S16, if it is determined that the process has been completed on all commands, then the line of the extracted command and the command are sorted by the line number in step S17, and the result is output as a command list, thereby terminating the process.

Figure 5B:
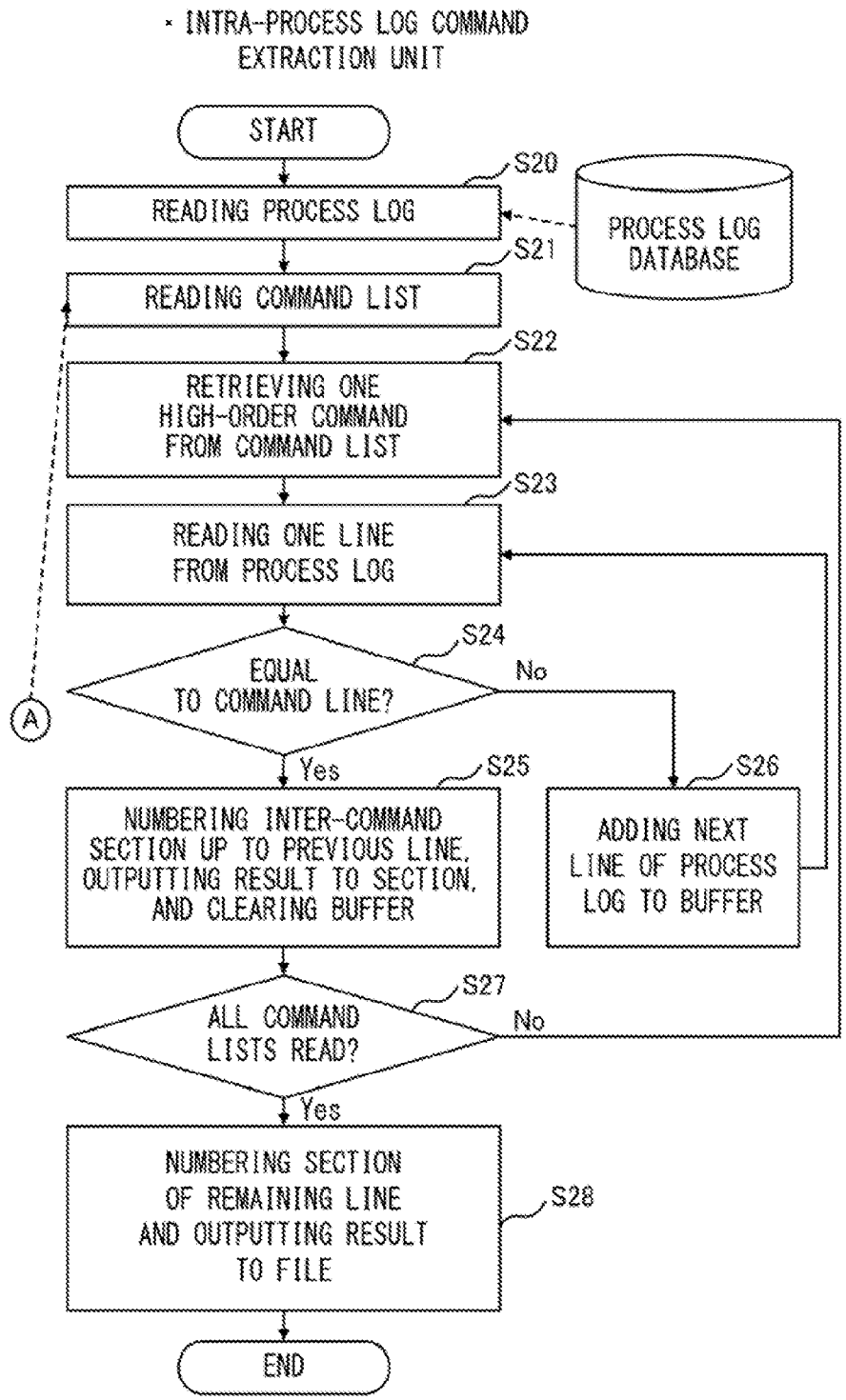

In FIG. 5B is an example of the flow of the process of the intra-process log command extraction unit. In the intra-process log command extraction unit, an extracted command from the instruction manual is extracted. In step S20, the process log is read from the process log database. Next, in step S21, the command list output from the intra-instruction-manual command extraction unit is read. In step S22, in the command list, for example, one high-order command is retrieved. In step S23, one line is read from the process log to the buffer. In step S24, it is determined whether or not the command in the process log matches the retrieved command. If the determination in step 24 is YES, then the inter-command section (if there is no preceding command, the section from the start up to the current line) up to the line before the current line in the process log is numbered in step S25, the result is output to the file, the buffer is cleared, and control is passed to step S27. If the determination in step S24 is NO, the next line in the process log is added to the buffer in step S26, and the process is repeated after returning control to step S23. In step S27, it is determined whether or not the commands of all command lists have been read. If the determination in step S27 is NO, control is passed to step S22. If the determination in step S27 is YES, the section of the remaining lines is numbered in step S28, the result is output to the file, thereby terminating the process.

Part (a) in FIG. 6 is a detailed flow of the process of the unclear level evaluation unit. The unclear level evaluation unit extracts a command commonly executed in the inter-command section in a plurality of process logs using the variance of the number of executions of the commands, and extracts an inter-command section including a larger number of commands not being commonly executed. In step S30, the number of executions for each command is counted for a plurality of process logs in each inter-command section. In step S31, the average and the variance of the counted number of executions are calculated for each command. In step S32, it is determined whether or not calculation has been performed on all commands. If the determination in step S32 is NO, control is returned to step S30, and the process is performed on other commands. If the determination in step S32 is YES, it is determined whether or not the process above has been performed on all process logs (process logs can be limited to a part) divided into command sections in step S33. If the determination in step S33 is NO, control is returned to step S30, and the process is repeated on other command sections. If the determination in step S33 is YES, a command section including commands whose variance of the count value of the commands is equal to or exceeds the threshold is extracted, thereby terminating the process.

Part (b) in FIG. 6 is a detailed flow of the process of the unclear part presentation unit. In the unclear part presentation unit displays an unclear part of the instruction manual. In step S40, the inter-command section of the instruction manual corresponding to the command section extracted in step S34 in part (a) in FIG. 6 is displayed as a section indicating a high unclear level, and a command whose variance is high is displayed as a command indicating a high unclear level in step S41, thereby terminating the process.

The unclearly written part in the instruction manual and displayed as described above can be improved in the quality of the instruction manual by correction by the instruction manual generator.

Examples of presenting data by the unclear part presentation unit are listed below.

Unclear part in the instruction manual
Numbering a sentence in the instruction manual between commands
Presenting an unclear part
Simultaneously displaying the instruction manual to visually check the position in the instruction manual
Detailed command
Displaying a list of commands whose variance is equal to or exceeds a threshold for the unclear part above The method of detecting an unclear part can be selecting from among the following settings.

A threshold is set when detecting data
Displaying five sections having higher variances (numbers are appropriately set) (five commands having higher variances, five sections having higher maximum variances, etc.)
At the displayed results, the process of repeatedly resetting and detecting detection conditions (threshold, number of sections in the section list having high variance) until an appropriate result can be acquired (for example, when the number of detection results is 0 or too small or large although a threshold is set).

FIGS. 7A through 9 are examples of the operations according to the present embodiment.

In the instruction manual as illustrated in FIGS. 7A through 9, a command is extracted. In part (a) in FIG. 7A, #rpm-Uvh/tmp/patch.rpm, #rpm-Uvh/tmp/patch2.rpm, #cp/apl/conf/a.conf/201007 are extracted. Three commands are extracted as illustrated in part (b) in FIG. 7A. Next, as illustrated in FIG. 7B, the commands (FIG. 7A(b)) appearing in the instruction manual are extracted from the three process logs, and numbered in the inter-command section as illustrated in FIG. 7C.

Next, as illustrated in FIG. 8, the number of occurrences and its average value and variance are calculated for each of the numbered sections. In the case illustrated in FIG. 8, the average value of the number of occurrences of #ps-eflgrepprograam1 in the section (2) is 0.667, and the variance is 0.333. The average value for #telnet 8080 server.jp is 0.333, and the variance is 0.333. For other commands, the average value of the number of occurrences is 1, and the variance is 0

Next, as illustrated in FIG. 9, the variance is compared with the threshold, and the command whose variance is larger than the threshold and the section including the command are displayed. In this example, the threshold is set as 0.3. As a result, #ps-eflgrep program1 and #telnet 8080 server.jp are extracted as commands whose variance is larger than the threshold. These commands are displayed with the variance 0.33 as detailed command display. The analysis result of the unclear part in the instruction manual is displayed with the instruction manual by indicating that the section (2) including the commands is unclear.

Figure 10:
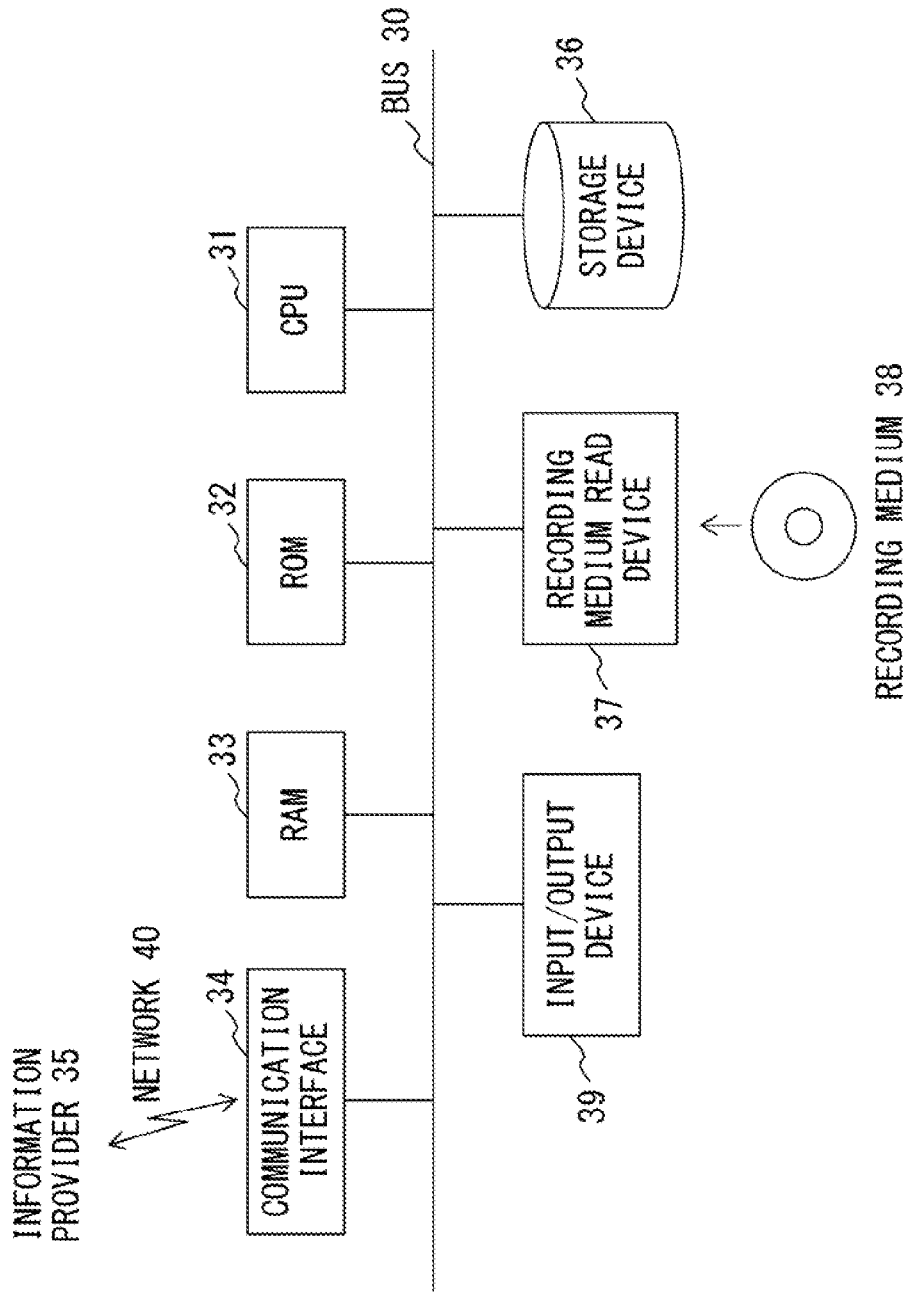
FIG. 10 is a configuration of the hardware of the information processing device when the process according to an embodiment of the present invention is performed by an information processing device such as a computer.

FIG. 10 is a configuration of the hardware of the information processing device when the process according to the present embodiment is performed by an information processing device such as a computer.

In the information processing device, a CPU 31 for performing an arithmetic operation is connected to other devices through a bus 30. ROM 32, RAM 33, a communication interface 34, a storage device 36, a recording medium read device 37, and an input/output device 39 are connected to the bus 30. A basic program for the operation of the information processing device is stored in the ROM 32. A program read from the storage device 36 is stored as executable in the RAM 33.

The storage device 36 includes a writable and readable recording medium built in the information processing device, and can be a hard disk etc. The recording medium read device 37 is a device for reading a program etc. stored in a recording medium 38 such as a flexible disk, CD-ROM, a DVD, Blu-Ray, etc., and the read program etc. is stored in the storage device 36, and then enters the RAM 33 and is executed. Otherwise, the program stored in the recording medium 38 is read from the recording medium read device 37, enters the RAM 33, and can be executed then.

The communication interface 34 communicates with an information provider 35 through a network 40. The program for processing the process according to the present embodiment is received by the communication interface 34 through the network 40, stored in the storage device 36, and can be executed then. Otherwise, a program provided by the information provider 35 can be executed in the network environment.

The input/output device 39 is a device for input and output to and from the information processing device, and includes an input device such as a keyboard, a tablet, a mouse, etc., and an output device such as a display, a printer, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A computer-readable, non-transitory medium storing a program used to direct a computer to perform the processes, the processes comprising:
    calculating, based on a common command commonly included in a plurality of process logs including a history of executed commands, a matching level of a process preceding the common command in the plurality of process logs, or a matching level of a process subsequent to the common command in the plurality of process logs;
    when the calculated matching level is equal to the matching level of the preceding process, outputting the matching level as associated with instruction manual data before the common command in instruction manual data including the common command; and
    when the calculated matching level is equal to the matching level of the subsequent process, outputting the matching level or a comparison result between the matching level and a specified threshold as associated with instruction manual data after the common command in instruction manual data including the common command.

2. A device which automatically detects an unclear description by extracting an unclear part in an instruction manual describing a processing instruction when managing and operating an information processing system, the device comprising:
    a log acquisition unit to acquire a log of processes performed by a plurality of instruction executers according to the instruction manual;
    an intra-instruction-manual command extraction unit to extract a command and its line position in the instruction manual;
    an intra-log command extraction unit to extract the command extracted by the intra-instruction-manual command extraction unit from each of the plurality of logs, and divide the command into inter-command sections;
    an unclear level evaluation unit used in the inter-command sections in the log, to count a number of executions of a command different from the extracted command with respect to the plurality of logs, and calculate a variance of the number of executions for each command among the plurality of logs; and
    an unclear part presentation unit to display a section of an instruction manual including a command whose variance is larger than a specified value according to a calculation result of the unclear level evaluation unit as a part which is possibly an unclear description.

3. The device according to claim 2, wherein
    the unclear part presentation unit displays a plurality of commands in a descending order of the variance, and a section of the instruction manual including the commands.

4. The device according to claim 2, wherein
    the command extracted from the instruction manual is used by an OS of an information processing system.

5. The device according to claim 2, wherein
    the specified value is variable, and a part indicating a high possibility of an unclear part is displayed with respect to the values different in the specified value, and the possible unclear part in the instruction manual is narrowed.

6. A method used by a computer for detecting an unclear description by extracting an unclear part in an instruction manual describing a processing instruction when managing and operating an information processing system, the method comprising:
    acquiring a log of processes performed by a plurality of instruction executers according to the instruction manual;
    extracting a command and its line position in the instruction manual;
    extracting the command extracted by intra-instruction-manual command extraction from each of the plurality of logs, and dividing the command into inter-command sections;
    being used in the inter-command sections in the log for counting a number of executions of a command different from the extracted command with respect to the plurality of logs, and calculating a variance of the number of executions for each command among the plurality of logs; and
    displaying a section of an instruction manual including a command whose variance is larger than a specified value according to a calculation result as a part which is possibly an unclear description.

7. A computer readable, non-transitory medium storing a program used to direct a computer to execute a method for automatically detecting an unclear description by extracting an unclear part in an instruction manual describing a processing instruction when managing and operating an information processing system, the computer performing the processes comprising:
    acquiring a log of processes performed by a plurality of instruction executers according to the instruction manual;
    extracting a command and its line position in the instruction manual;
    extracting the command extracted by intra-instruction-manual command extraction from each of the plurality of logs, and dividing the command into inter-command sections;
    being used in the inter-command sections in the log for counting a number of executions of a command different from the extracted command with respect to the plurality of logs, and calculating a variance of the number of executions for each command among the plurality of logs; and
    displaying a section of an instruction manual including a command whose variance is larger than a specified value according to a calculation result as a part which is possibly an unclear description.

* * * * *